Figure 1:
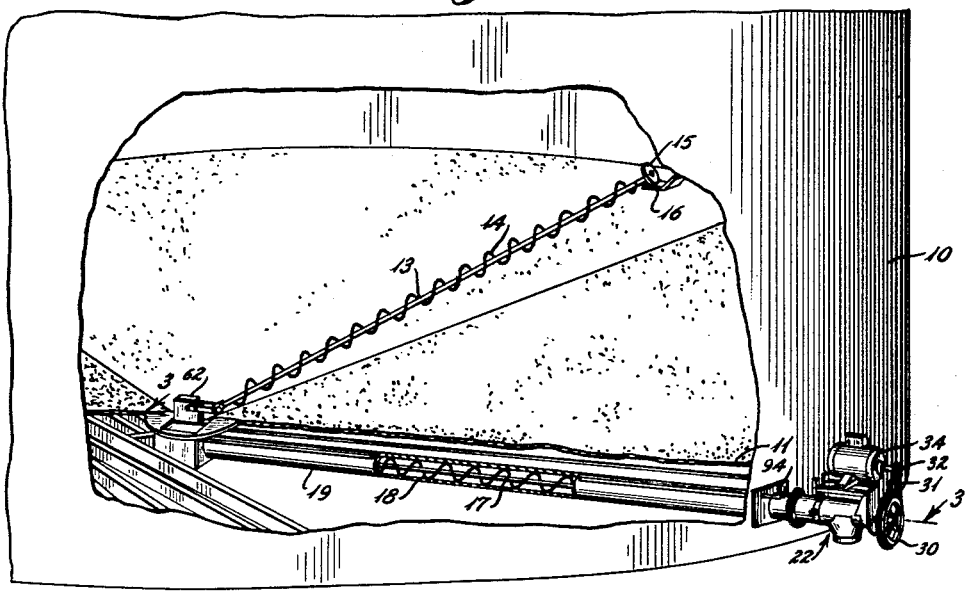

Oct. 6, 1964   W. R. LONG   3,151,749
GRAIN BIN SWEEP UNLOADER
Filed July 26, 1962   3 Sheets-Sheet 1

INVENTOR
W. R. LONG

BY
ATTORNEY

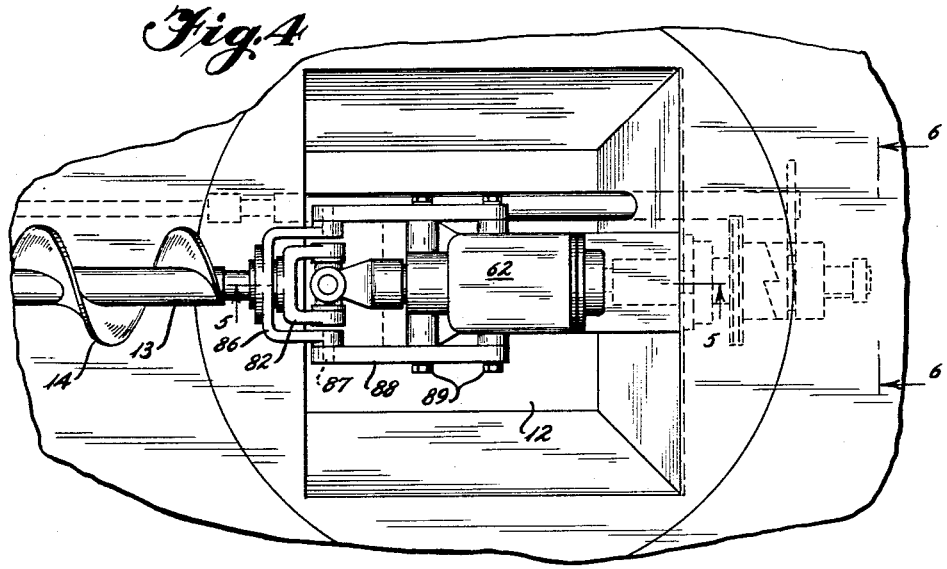
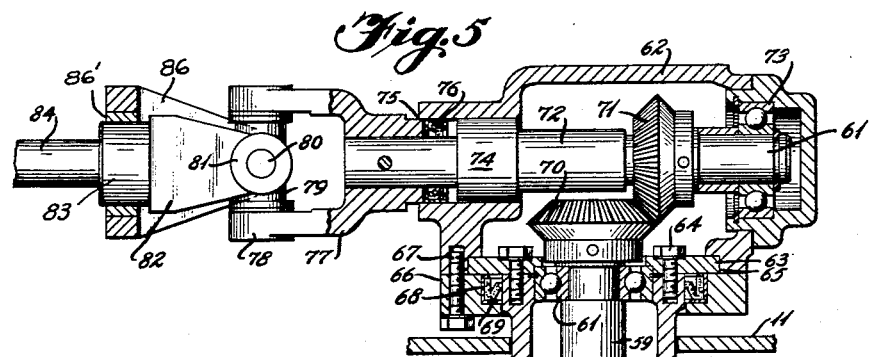
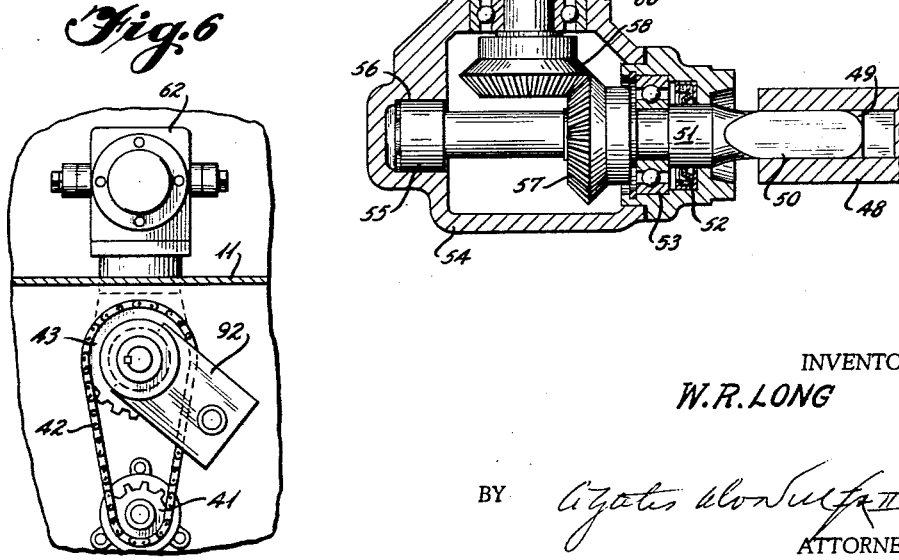

United States Patent Office 3,151,749
Patented Oct. 6, 1964

3,151,749
GRAIN BIN SWEEP UNLOADER
William R. Long, Tarboro, N.C., assignor to Long Manufacturing Company, Tarboro, N.C.
Filed July 26, 1962, Ser. No. 212,666
3 Claims. (Cl. 214—17)

This invention relates to the harvesting of crops including grain, and to the handling storage and treatment of the harvested product in a manner to maintain it in the best possible condition and readily available for use in any desired manner on the farm and elsewhere.

The invention relates particularly to grain storage and drying bins, to the removal of the contents or unloading thereof, and to the structure or mechanism by which such emptying or unloading is accomplished including a package type detachable power plant which can be readily used in connection with a number of grain bins or other power requiring mechanism.

Grain storage and drying bins have been used of generally cylindrical construction, each with upright axis and a floor or bottom having a central discharge opening and a generally radially disposed auger type conveyor movable around such opening to sweep the grain towards and discharge it through such opening. Grain bins of this kind have included a generally horizontal discharge pipe or sleeve with an inner end below and in communication with such discharge opening and an outer end terminating outwardly beyond the side of the bin for easy access and in order that the discharged grain may be collected when moved through the sleeve by an auger or screw type conveyor located within such pipe or sleeve. It has been the custom to drive the two augers or screws independently by two separate motors and with the motor for driving the first or sweep auger located within the bin and exposed to the grain therein. Also the motor or power plant for driving the discharge auger was connected to the shaft of the latter in such a manner that it could not be readily detached but to remove it, it was necessary to remove the auger endwise from its housing which consequently required substantial space, time and effort.

It is an object of the invention to improve the manner of emptying or removing grain from a drying and storage bin including a power plant with structure for driving both augers therefrom and with controls accessably located adjacent such plant as well as to provide means for quick connection and disconnection of the power plant and in addition the provision of means for maintaining the sweep screw or auger within the bin in an elevated position with a rotor on its end resting on a bracket or support whereby upon starting the power plant will be relieved of a part of its load until the sweep auger or conveyor within the bin is moved from its support and allowed to lower to cause the movement of grain in a generally radial and horizontal direction towards the discharge from the bin.

Another object of the invention is to provide a grain drying and storage bin with a sweep type conveyor within the bin and a discharge type conveyor beneath the bin with a driving connection between such conveyors including a universal mounting of the inner end of the sweep conveyor but with the drive between the discharge and sweep conveyors selectively maintained regardless of the angularity of the sweep conveyor and with means whereby the sweep conveyor will be caused to travel around the bin as well as rotate to move grain towards the center of the bin.

Figure 2:
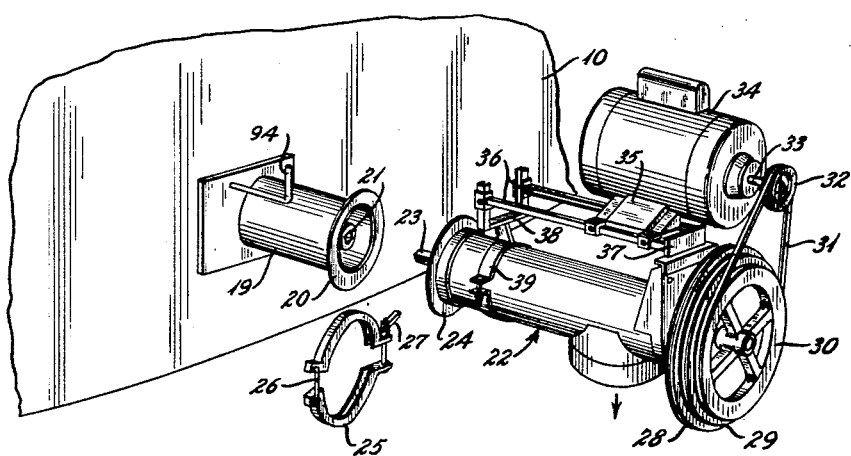
Figure 3:
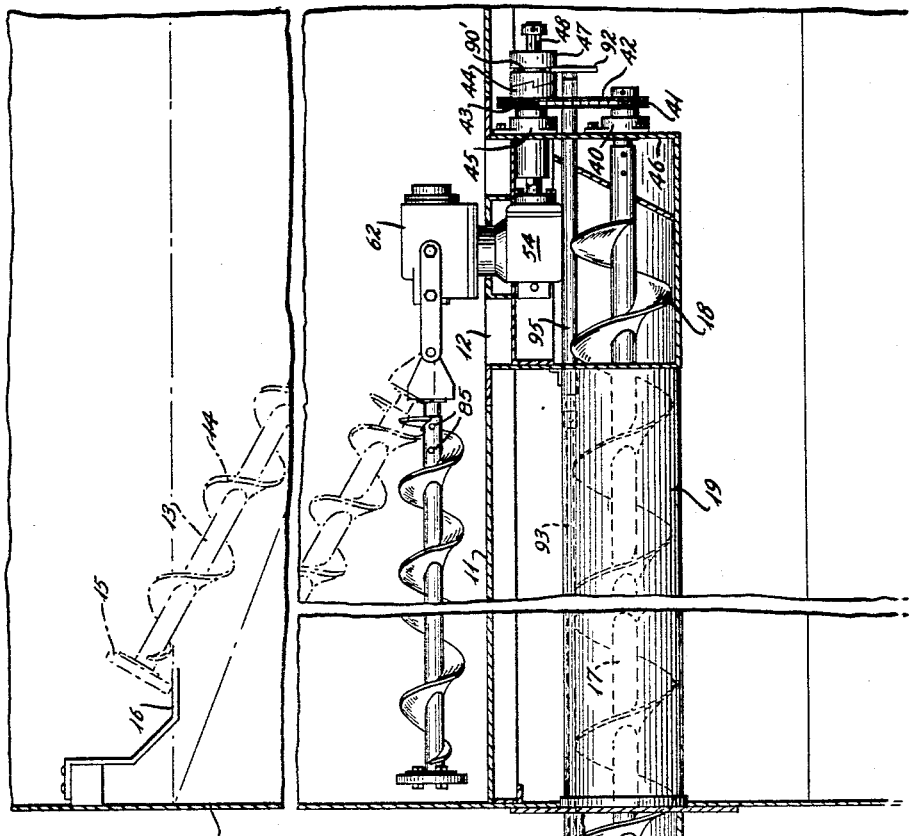
Figure 3:
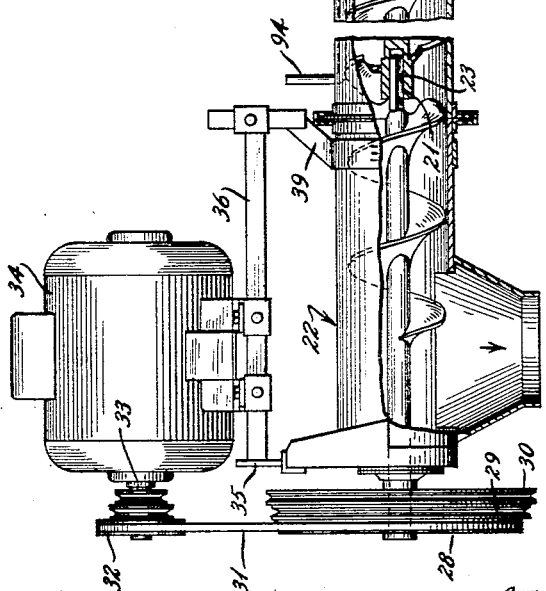

Other objects and advantages of the invention will be apparent from the following description taken in conjunction with the accompanying drawings wherein:

FIG. 1 is a fragmentary perspective of a bin with the invention applied thereto;

FIG. 2, a perspective of a small fragment of a bin and a power plant with means for readily applying and removing the power plant;

FIG. 3, a horizontal radial section on the line 3—3 of FIG. 1;

FIG. 4, a fragmentary top plan view;

FIG. 5, a vertical section on the line 5—5 of FIG. 4; and

FIG. 6, an end elevation on the line 6—6 of FIG. 5.

Briefly stated, the invention is an unloader for a grain storage and drying bin and a quickly attachable and removable power plant for supplying power for operating the unloading mechanism, which power plant is susceptible of use with a number of such bins instead of a power plant for each bin, the unloading mechanism including a sweep type auger or screw conveyor within a bin for moving grain into a position to be discharged through a central opening in the floor of the bin, and a discharge auger or screw type conveyor within a pipe for carrying the discharged grain outwardly beyond the lateral limit of the bin. The power plant supplying power to the discharge conveyor from which the sweep conveyor is driven through cooperating gearing and gear boxes and a yoke by which the sweep conveyor is moved in a generally circular path about the central discharge opening.

With continued reference to the drawings, a conventional grain storage and drying bin 10 is of generally cylindrical construction and is provided with a perforated steel drying floor 11 with a central discharge opening 12 (FIG. 2) from which grain within the bin is adapted to be discharged.

In order to facilitate the discharge a sweep auger is provided which may be in the form of a shaft 13 with a screw 14 attached thereto. A roller 15 may be mounted on the remote end of the shaft and may be supported on a bracket or shelf 16 attached to the wall of the bin 10.

Ordinarily the sweep auger is driven by a motor located within the bin with the accompanying disadvantages previously indicated but with the present invention the lower end of the sweep auger is connected to be driven from the discharge auger composed of a shaft 17 and a screw 18 within a sleeve 19 having an external flange 20, and a polygonal opening 21.

A power unit 22 is provided which includes the rear portion of the discharge conveyor including a polygonal shaft end 23 adapted to fit within the socket 21 for driving the discharge auger. The power unit also has a flange 24 adapted to fit against the flange 20 of the sleeve 19 of the discharge auger and be fixed in such position by means of a clamp including a pair of semi-circular segments 25 of U-shaped cross section, preferably although not necessarily, with a hinge 26 and a clamping nut and bolt 27 in the other end permitting quick application and removal.

The shaft 23 of the power plant 22 has attached thereto multiple pulleys 28, 29, 30, any one of which may receive a belt 31 driven by a pulley 32 from a shaft 33 of a motor 34. In order to locate the pulley 32 of the power plant or motor 22 in the same plane or proper driving position relative to the pulleys 28, 29 and 30, the motor is provided with a slide mount including a base 35 on supporting bars 36. The bars 36 are mounted by means of a bracket 37 at one end on the power unit 22 and at the opposite end the bars 36 are mounted by means of a bracket 38 and the clamp 39 on said power unit. Thus connection between the power unit and the discharge auger is localized exteriorly of the bin which makes it possible to use a single power unit to unload several bins without the necessity of removing the discharge auger from the sleeve in which it is mounted unlike in prior devices.

The power unit 22 is employed to drive the discharge auger beneath the bottom or floor of the bin and from the inner end of the discharge auger to drive the sweep auger within the bin from such sweep auger's contiguous end. This drive of the sweep auger from the discharge auger is accomplished by means of the polygonal shaft 23 fitting in the complementary polygonal socket 21 of the discharge auger shaft 17. The inner end of the discharge auger shaft 17 is supported in a bearing 40 through which it extends and has fixed on its outer end a sprocket 41 about which is engaged a chain 42 which drives a sprocket 43 on a freely rotating clutch 44 mounted in a bearing 45, the bearings 40 and 45 being mounted on an end plate 46. A complementary clutch member 47 is adapted to be driven when it is engaged with the clutch member 44, the clutch member 47 being keyed on a shaft 48 which extends through the clutch member 44 and bearing 45 and is provided at its inner end with a socket 49 in which is received the complementary polygonal end 50 of a stub shaft 51 which extends through a shaft seal 52 and a bearing 53 in a gear housing 54, the remote end of the stub shaft 51 fitting within a roller bearing 55 of a socket 56 within the gear housing 54. Fixed on the shaft 51 is a bevel gear 57 which drives a bevel gear 58 on a right angular shaft 59 which extends upwardly through the floor 11 of the bin 10 and an extension 60 of the housing 54. The upper end of the extension 60 includes a bearing 61 for the shaft 59 and to such upper end is rotatably connected a second gear box 62.

The rotatable connection is accomplished by the use of a plate 63 attached by bolts or other fasteners 64 and the peripheral edge of such plate being received in a recess 65 in the gear box 62, such plate being retained within said recess by means of a retaining ring 66 held in place by bolts or other fasteners 67 and with a socket 68 in which is retained a sealing gasket 69. Thus the gear box 62 located above the floor 11 and within the bin 10 may rotate relative to the gear box 54 beneath such floor.

The shaft 59 driven through bevel gears 57 and 58 has fixed on its upper end a bevel gear 70 which meshes with a similar gear 71 fixed to a stub shaft 72 mounted in bearings 73 and 74 within the gear box 62 having an open end 75 containing a shaft seal 76 through which the shaft 72 extends and to the latter of which is attached a yoke 77 having bearing ring forming arms 78 in which is mounted a pin or bearing member 79, such pin or bearing member being rotatable about its axis and having a corresponding pin 80 at right angles thereto and journaled within bearing rings 81 of a yoke 82 attached to a shaft 83 having a polygonal portion 84 slidably received in a complementary polygonal socket 85 of the sweep auger shaft 13 to permit slight endwise movement of the sweep auger so that it may not be of a length greater than the radius of the floor or bottom of the bin.

An additional yoke or bracket 86 is mounted on pivots 87 between a pair of arms 88 fixed by bolts or other fasteners 89 fixed to the gear housing 62. By the use of the universal joint, the sweep auger may raise and lower as it is rotated with the gear box 62 and on account of the yoke or bracket 86 it will be caused to advance over the floor or bottom of the bin as it rotates, thus causing the discharge of grain from the bin.

After the removal of grain from the bin and the latter is cleaned, the sweep auger should be left in the position of FIG. 1 with the roller 15 on the bracket 16 to reduce the power required by the power unit when the sweep auger is initially rotated and whereupon the roller 15 will move from the bracket and permit the sweep auger to lower and perform its full function.

In the operation of the invention the roller 15 of the sweep auger will be supported upon the shelf 16 within the bin when the power plant 22 is connected to drive the auger or screw shaft 17. The drive of the sweep auger shaft 13 will be determined by whether or not the clutch members 44 and 47 are engaged and in order to control this engagement, the clutch member 47 is provided with a slot 90 in which a yoke 92 is received, such yoke being attached to a control rod 93 having an operating end 94, such control rod being mounted in a bearing 95. The operating end 94 is near the power plant 22 and is readily operable from such position. When it is in the position that the sweep auger is operated initially the roller 15 will move from the shelf 16 to permit the sweep auger to lower into position to perform its sweeping operation with minimum load on the motor at the start but quickly applying such load. After the grain bin is emptied, the power plant may be disconnected by releasing the clamp 25 whereupon such power plant may be used with another bin or another location.

It will be obvious to those skilled in the art that various changes may be made in the invention without departing from the spirit and scope thereof and therefore the invention is not limited by that which is illustrated in the drawing(s) and described in the specification, but only as indicated in the accompanying claims.

What is claimed is:

1. Apparatus for unloading a generally cylindrical grain bin having a flat bottom with a discharge opening disposed centrally thereof comprising gearing mounted within said discharge opening and having an upper portion located above said flat bottom, said upper portion being rotatably mounted on the lower portion of said gearing, a discharge auger beneath said bottom and extending radially from the exterior of said tank into said discharge opening, means for driving one end of said discharge auger, means at the opposite end of said discharge auger for selectively connecting said discharge auger to said gearing for driving the latter, a rigid sweep auger located within said bin, universal means pivotally connecting said sweep auger to the upper portion of said gearing, yoke means pivotally connected to the upper portion of said gearing and rotatably receiving the shaft of said sweep auger to facilitate vertical movement of said sweep auger, said sweep auger extending generally radially from the upper portion of said gearing to a position adjacent to the periphery of said bin.

2. The structure of claim 1 in which said selective driving means for said gearing includes clutch means located exteriorly of said discharge opening.

3. The structure of claim 1 including bracket means for supporting said sweep auger in raised position until said gearing is operated.

References Cited in the file of this patent

UNITED STATES PATENTS

| | | |
|---|---|---|
| 2,266,945 | Abraham | Dec. 23, 1941 |
| 2,412,193 | Anderson | Dec. 10, 1946 |
| 2,782,903 | Kennedy | Feb. 26, 1957 |
| 2,799,407 | Vanier et al. | July 16, 1957 |
| 2,914,198 | Hein | Nov. 24, 1959 |
| 2,927,682 | Dorris et al. | Mar. 8, 1960 |
| 2,931,522 | Sullivan | Apr. 5, 1960 |
| 2,934,224 | Puckett | Apr. 26, 1960 |
| 3,064,830 | Reed | Nov. 20, 1962 |
| 3,064,831 | Cook | Nov. 20, 1962 |
| 3,067,914 | Ellaby | Dec. 11, 1962 |
| 3,084,814 | Schaefer | Apr. 9, 1963 |